United States Patent [19]

Lee

[11] Patent Number: 4,531,195
[45] Date of Patent: Jul. 23, 1985

[54] POLYCHROMATIC TIME-INTEGRATING OPTICAL PROCESSOR FOR HIGH-SPEED AMBIGUITY PROCESSING

[76] Inventor: John N. Lee, 13208 Dauphine St., Silver Spring, Md. 20906

[21] Appl. No.: 495,028

[22] Filed: May 16, 1983

[51] Int. Cl.³ .................. G06G 9/00; G02B 5/18; G01S 13/58
[52] U.S. Cl. .................. 364/822; 350/162.12; 343/9 PS
[58] Field of Search .............. 364/807, 819, 822, 829, 364/837, 861; 350/162.11, 162.12, 162.13, 162.14, 162.15; 343/9 PS

[56] References Cited

U.S. PATENT DOCUMENTS

| | | | |
|---|---|---|---|
| 3,355,579 | 11/1967 | Robertson | 235/181 |
| 3,398,269 | 8/1968 | Williams | 235/181 |
| 3,483,557 | 12/1969 | Skenderoff et al. | 343/9 |
| 3,634,749 | 1/1972 | Montgomery | 324/77 I |
| 3,688,101 | 8/1972 | Henning | 235/181 |
| 3,732,565 | 2/1976 | Symaniec et al. | 343/9 |
| 4,071,907 | 1/1978 | Casasent | 364/822 |
| 4,099,249 | 7/1978 | Casasent | 364/822 |
| 4,110,016 | 8/1978 | Berg et al. | 364/822 X |
| 4,123,142 | 10/1978 | Fleming et al. | 350/162 SF |
| 4,139,277 | 2/1979 | Berg et al. | 364/822 X |
| 4,225,938 | 9/1980 | Turpin | 364/822 |
| 4,310,894 | 1/1982 | Lee et al. | 364/822 |
| 4,389,092 | 6/1983 | Tamura | 350/162.12 |
| 4,426,134 | 1/1984 | Abramovitz et al. | 364/819 X |
| 4,440,472 | 4/1984 | Cohen | 350/162.12 |
| 4,468,093 | 8/1984 | Brown | 350/162.12 |

OTHER PUBLICATIONS

R. Sprague, "A Review of Acousto-Optic Signal Correlators" *Optical Engineering*, vol. 16, pp. 467-474 (1977).

R. Sprague and C. Koliopoulos, "Time Integrating Acoustooptic Correlator", *Applied Optics*, vol. 15, pp. 89-92 (1976).

J. D. Cohen, "Ambiguity Processor Architectures Using One-Dimensional Acousto-Optic Transducer", *Proc. SPIE*, vol. 180, pp. 134-142 (1979).

*Primary Examiner*—Jerry Smith
*Assistant Examiner*—Gary V. Harkcom
*Attorney, Agent, or Firm*—Robert F. Beers; William T. Ellis; Alan P. Klein

[57] ABSTRACT

A signal processor for generating the ambiguity integral using a modulatable, broadband, incoherent light source, a multiplicity of acousto-optic cells and diffraction gratings, and a two-dimensional time-integrating photodetector array. The various colors of the source spectrum are shifted by differing radio frequencies. These modified spectral components are also modulated by an input signal and serve as input sources for performing a multiplicity of correlations using an acousto-optic cell with an unknown Doppler-shifted signal. The answer is displayed on a two-dimensional time-integrating photodetector array where the spectral components are dispersed within the columns. The row corresponding to the color that has been properly frequency-compensated will contain the correlation or ambiguity peak, thereby identifying the Doppler component. Position within the row determines range.

20 Claims, 5 Drawing Figures

POLYCHROMATIC TIME-INTEGRATING OPTICAL PROCESSOR FOR HIGH-SPEED AMBIGUITY PROCESSING

BACKGROUND OF THE INVENTION

This invention relates to optical processors, and more particularly to optical processors for performing real-time correlations.

Under many circumstances an acoustic or electromagnetic signal is received from a moving source and information as to the location and velocity of the source is desirable. Examples of where this occurs are undersea surveillance and radar surveillance. A common method of representing this is on a graph known as an ambiguity plane, where velocity is plotted against distance. The relative doppler shift and time shift between two signals so received can be used to extract this data.

The ambiguity plane is prepared by evaluating the ambiguity integral which is defined as $$\chi(\omega,\tau) = \int S_1(t) S_2^*(t-\tau) e^{-i\omega t} dt \quad (1)$$

In this equation $S_1(t)$ and $S_2(t)$ are two signals being compared expressed as functions of time. The variable $\tau$ is introduced to correct for the fact that although it is expected that $S_1(t)$ and $S_2(t)$ should have a similar form, they will, in general, be shifted in time relative to each other. The function $S_2^*(t-\tau)$ is the complex conjugate of $S_2(t-\tau)$ which is the time shifted version of the signal actually received. The factor $e^{-i\omega t}$ is introduced to correct for the frequency difference between $S_1(t)$ and $S_2(t)$ caused by the Doppler effect. The values of $\omega$ and $\tau$ which yield a maximum value of the ambiguity integral may be used to extract information about the velocity and range of the object under surveillance.

FIG. 1 shows a typical situation where ambiguity processing is used. A target 10 emits a signal, represented by arrows 11, in all directions. The signal is received by a first receiver 12 and a second receiver 13. It is clear that if the target is moving there will be a different. Doppler shift observed by the two receivers 12 and 13. If the receivers 12 and 13 are different distances from the target 10 the signals 11 will also arrive at different times. Therefore the signal observed by receiver 12 is of the form $$S_1(t) = f(t) e^{i\omega_1 t} \quad (2)$$

and the signal $S_2(t)$ observed by receiver 13 is of the form $$S_2(t) = f(t+t_o) e^{i\omega_2(t+t_o)} \quad (3)$$

In these expressions f(t) may be regarded as a function modulating a carrier wave. In equation (3) $t_o$ is a constant which expresses the difference of propagation time for the signal received by the first receiver 12 and the second receiver 13. In general $t_o$ may be positive, negative or zero. If $t_o$ is positive, the signal arrives at receiver 12 before it arrives at receiver 13. If $t_o$ is negative, the signal arrives at receiver 13 first. If $t_o$ is zero both receivers 23 and 13 receive the signal at the same time. The terms $e^{i\omega_1 t}$ and $e^{i\omega_2(t+t_o)}$ are carrier waves of angular frequency $\omega_1$ and $\omega_2$ respectively. The difference between $\omega_1$ and $\omega_2$ is the relative Doppler shift. It is clear that the ambiguity function of equation (1) will take on a maximum value when $$\tau = t_o \text{ and } \omega = \omega_1 - \omega_2. \quad (4)$$

It should be noted that these signals could arise from radar surveillance, as shown in FIG. 2. In the case of radar, a transmitter 14 emits a signal 15. Signal 15 is designated $S_1(t)$ and has the form shown in equation (2). Signal 15 strikes target 16 and returns as reflected signal 17. Reflected signal 17 is received by receiver 18. Reflected signal 17 is designated $S_2(t)$ and has the form of equation (3) where $t_o$ is the time elapsed between the transmission of signal 15 by transmitter 14 and the reception of reflected signal 17 by receiver 18. For radar surveillance, $t_o$ will always be positive. If the target 16 is moving relative to transmitter 14 and receiver 18, $\omega_2$ will be Doppler shifted from the original value of $\omega_1$. The following analysis applies equally to the situations shown in FIGS. 1 and 2.

Evaluation of the ambiguity integral $\chi(\omega,\tau)$ can, of course, be implemented on a digital computer. However, this is a difficult and time-consuming task because of the two-dimensional nature of $\chi(\omega,\tau)$. Similarly 1-D analog or digital matched filters (e.g., tapped delay lines) can compute $\chi(\omega,\tau)$ only with a two-step approach. For example, if $S_2(t)$ is the radar return signal with a Doppler shift, all possible shifts are investigated, with Eq. (1) being computed for each possible value of $\omega$.

Since optics is inherently two-dimensional, people have naturally sought to implement $\chi(\omega,\tau)$ optically. Several methods have been successfully demonstrated, while others are conceptual only.

An examination of equation (1) reveals a strong similarity to a Fourier transform. If $F_t$ is the Fourier transform operator which acts on the time variable, the following definition applies:

$$F_t[g(t,\tau)] = \int g(t,\tau) e^{i\omega t} dt \quad (5)$$

If $g(t,\tau)$ is taken to be $$g(t,\tau) = S_1(t) S_2^*(t+\tau) \quad (6)$$

it is apparent that a simple substitution will make equation (1) and equation (5) identical. Therefore in the prior art, the product of $S_1(t)$ and $S_2^*(t+\tau)$ of equation (6) is produced and optically Fourier transformed to evaluate equation (1).

The traditional approach has been to set up an image plane correlator and at the image or Fourier plane, insert a film or spatial light modulator containing rows of data consisting of shifted versions of $S_2(t)$. Equation (1) is then implemented by Fourier transforming along one axis to produce the $\omega$ axis on the output and imaging along the other axis to produce the correlation on the $\tau$ axis of the output.

Use of film or even present-day spatial light modulators is undesirable because of the slow rate at which information can be written and changed. More recently, near-real-time generation of ambiguity surfaces has been accomplished using acousto-optic techniques. Acousto-optic techniques may be classified as being either time-integrating or space-integrating. The space-integrating techniques generally use the idea of Fourier transformation in one dimension and imaging in the other.

In a typical prior art space-integrating system, coherent light from a laser is expanded and collimated by lenses, and impinges on a data mask having the function $S_2^*(t+\tau)$ encoded thereon in the form of lines. The t variable is represented in the horizontal direction and the $\tau$ variable in the vertical. A lens images the data mask on another data mask which is encoded with $S_1(t)$ represented by lines. As a result the light passing the second data mask is encoded with the product $S_1(t)S_2^*(t+\tau)$. The light next passes through a cylindrical lens and a spherical lens and arrives at the ambiguity plane. The resultant image is Fourier transformed in the horizontal or t dimension and imaged in the vertical or $\tau$ dimension. Therefore the image represents the integral (1). The maximum value appears as the point of greatest light intensity, i.e. the brightest point.

Such processors are called space-integrating optical processors because the integration operation required in equation (5) is obtained by a lens collecting and focusing light rays over a region of space defined by the second data mask.

The data masks are produced by the use of a two-dimensional spatial light modulator. Production of a mask with such a modulator requires many linear scans and is the limiting factor on the speed of the system. U.S. Pat. No. 4,071,907 issued to David Paul Casasent shows an improvement by substituting an electronically-addressed light modulator (EALM) tube for one of the data masks. An EALM tube is a multiple scan unit, however, with the same limitations inherent in all present-day two-dimensional light modulators, i.e., slow rate at which information can be written or changed (<100 frames/sec).

A second limitation arises with space-integrating processors; the data $S_1(t)$ and $S_2^*(t+\tau)$ must fit in their entirety onto the two data masks, respectively. This limitation also applies to other prior-art space-integrating processors such as in U.S. Pat. No. 4,310,894 issued to T. C. Lee, et al., where acoustic cells are used in place of the data masks. The length of the acoustic cell determines the maximum length signals permissible.

Time-integration approaches generally utilize chirp (linear FM waveform) techniques whereby signal $S_1$ or $S_2$ must be premultiplied with a chirp and later correlated with a second chirp to obtain $\chi(\omega,\tau)$. Such processors are called time-integrating optical processors because time integration of an optical signal onto a photodetector array is used to effect the integral in equation (5). In a typical prior art time-integrating system such as disclosed in U.S. Pat. No. 4,225,938 issued to T. M. Turpin, a laser light source produces a light beam which is intensity-modulated by an acousto-optic modulator with signal h(t). The modulated light is then passed through two acousto-optic Bragg cells which are oriented orthogonal to each other and which are respectively driven by signals $g_x(t)$ and $g_y(t)$. The signals $g_x(t)$ and $g_y(t)$ produce additional diffractions of the light, and the finally diffracted light beam intensity is integrated at a two-dimensional detector array. The ambiguity function $\chi(\omega,\tau)$ can be obtained in two ways. One is to use a moving mirror to introduce Doppler shifts onto a second light beam which is interfered with the final diffracted beam from the second Bragg cell.

However, a more common approach disclosed by J. D. Cohen in Proc. SPIE, 180, 134 (1979) is to eliminate the mirrors and utilize a chirp-transform technique. The signal $f_x(t)=S_1(t)$ is multiplied by a chirp function $f_y(t-)=\exp(it^2/2)$, using a mixer, producing the resultant signal h(t) to the acousto-optic modulator. The inputs $g_x(t)$ and $g_y(t)$ are chosen to be $g_x(t)=S_2^*(t)$ and $g_y(t-)=\exp(it^2/2)$. The resultant integrated signal on the photodetector array is $$\chi(\omega,\tau)=\int_t S_1(t)S_2^*(t-\tau)\exp(i\omega t)dt \tag{7}$$

where $\tau$ is y/v, with v the acoustic wave velocity in the Bragg cell which is driven by the signal $g_y(t)$.

The time integrating systems do not have a limit on maximum signal length permissable. They do however, suffer from reliance on mechanically moving parts or from the complexity of a chirp-transform architecture.

SUMMARY OF THE INVENTION

It is therefore an object of this invention to produce a graph of the ambiguity plane in near-real-time using acousto-optic techniques.

Another object is to produce such a graph without the signal-length limitation of space-integrating processors.

A further object is to produce such a graph without the need for mechanically moving parts.

Yet another object is to produce such a graph without the need for complex chirp-transform architecture.

These and other objects of the present invention are achieved by an apparatus for optically evaluating the ambiguity integral using a beam of incoherent broadband light. The apparatus includes modulation means to modulate the beam of incoherent broadband light by a reference signal. A linear acoustic cell is disposed with its longitudinal axis parallel to a first spatial dimension. A first dispersion means disperses the modulated beam of incoherent broadband light along the first spatial dimension and brings it to focus along the longitudinal axis of the cell, so that the component waves are arranged in order of their wavelengths and are each modulated by a different Doppler-shifted variation of the reference signal. A transducer is coupled for inputting a test signal to the cell as a travelling wave to scatter by Bragg diffraction the light focussed along the cell's longitudinal axis. A second dispersion means disperses the diffracted light along a second mutually orthogonal spatial dimension and brings it to focus at a time-integrating photodetector to produce a graph of the ambiguity plane wherein the colors identify the different Doppler components.

The present invention overcomes the signal-length limitation of space-integrating processors by using time integration and overcomes the complexity of a chirp transform architecture and the undesirability of mechanically moving parts in the time-integrating approaches in the prior art. Specifically, ambiguity-function generation is obtained via color encoding using a broadband incoherent source in conjunction with acousto-optic cells.

The present invention overcomes the complexity of a chirp architecture in a time-integrating structure by using a broadband incoherent source. Use of incoherent light also offers added advantages over laser sources, in that speckle noise is much reduced and there is greater immunity to optical imperfections. Normally, the time-integrating chirp architecture requires two crossed Bragg cells. Here, two Bragg cells are again required, but they are not crossed and only a single chirp signal is required. This is achieved by using the colors of the light spectrum to carry information.

The method described relies on a different interpretation of equation (1); rather than relying on the identification of equation (1) as a Fourier transform integral, the factor $e^{-i\omega t}$ in the integrand of equation (1) is treated as a correction factor to the carrier frequency of either signal $S_1(t)$ or $S_2(t)$. If either $S_1$ or $S_2$ is a Doppler-shifted version of the other and the $e^{-i\omega t}$ factor corresponds exactly to the Doppler shift, the corrected signal and the unshifted signal become identical, and equation (1) becomes a correlation of two identical signals. This correlation maximizes at the $\tau$ value that corresponds to a maximum value of the ambiguity integral, as desired.

Additional advantages and features will become apparent as the subject invention becomes better understood by reference to the following detailed description when considered in conjunction with the accompanying drawings wherein:

DESCRIPTION OF THE PREFERRED EMBODIMENT

Figures 1, 2, 3:
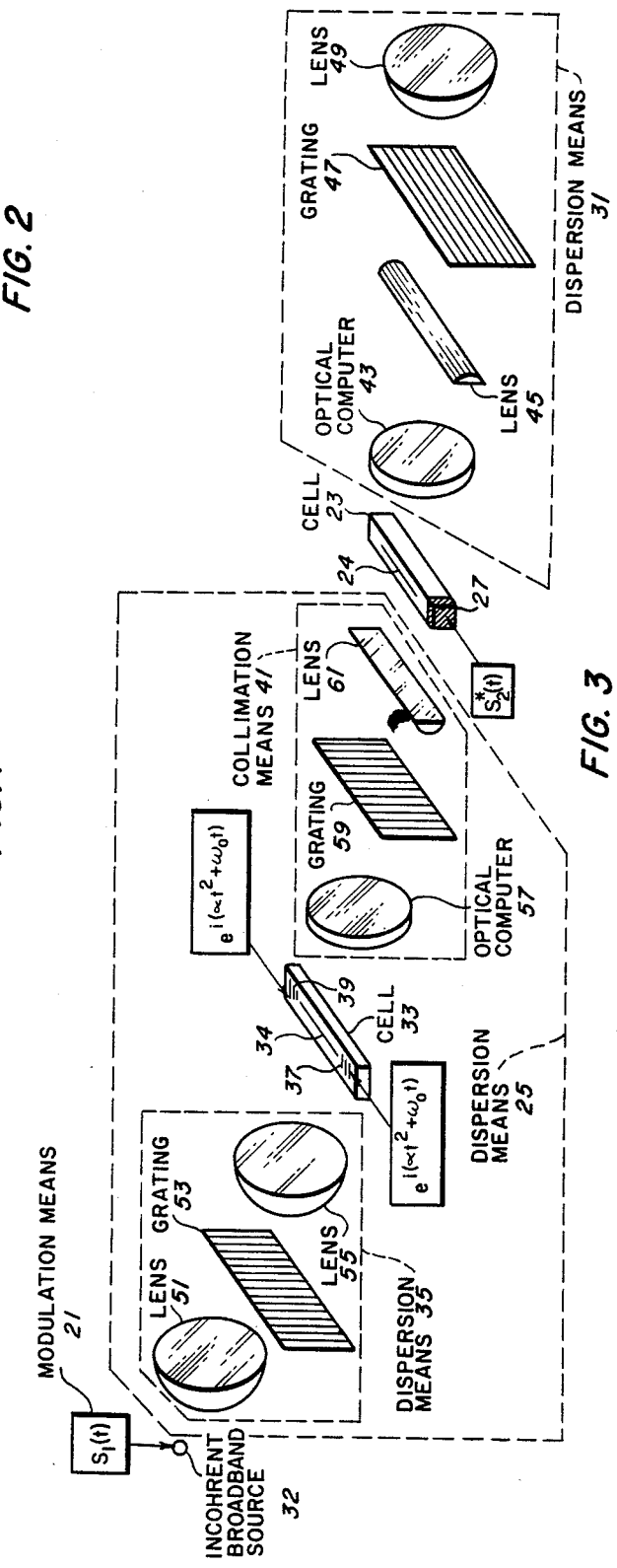
FIG. 1 is a basic scenario in which ambiguity processing is used.
FIG. 2 is a variation of FIG. 1.
FIG. 3 is a preferred embodiment of the present invention to perform ambiguity calculations.

Referring to FIG. 3, the apparatus for optically evaluating the ambiguity integral uses a beam of incoherent broadband light having a continuum of approximately equal intensity spectral components. For example, the light may be white light. The apparatus includes modulation means 21 to intensity modulate the beam of light by a reference signal $S_1(t)$; a linear acoustic cell 23 disposed with its longitudinal axis 24 parallel to the $\tau$ direction (the horizontal spatial dimension in FIG. 3); first dispersion means 25 disposed in front of the cell 23; a transducer 27 coupled to the cell 23; a two-dimensional time-integrating photodetector 29 defining the $\omega,\tau$ plane; and second dispersion means 31 disposed between the cell 23 and the time-integrating photodetector 29.

The beam of incoherent broadband light may be generated by a source 33 such as an LED or an arc lamp. The former is preferred because an LED can be directly current-modulated, whereas an arc lamp requires an external modulator for intensity modulation, and because an LED is intrinsically more compact than an arc lamp. LED's allow modulation over a dynamic range of 30 dB and at up to 100 MHz rates. It is desirable to operate the LED at a high bias level to maximize the spectral breadth of the light emission. Typical spectral breadths of 200 Å are attainable.

Figure 4:
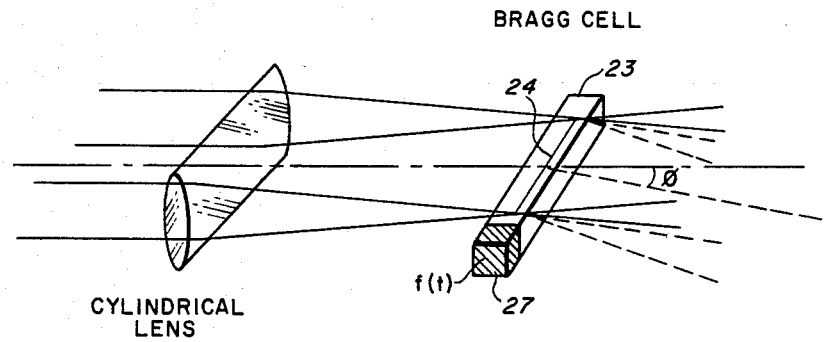
FIG. 4 shows the use of a Bragg cell of the bulk-wave design to encode a light beam with data.

The linear acoustic cell 23 and the transducer 27 may comprise, for example, a Bragg cell of the bulk-wave design, shown in more detail in FIG. 4 wherein a desired function f(t) is applied to a piezoelectric transducer 27 as an electronic signal, and the transducer converts the electronic signal to a mechanical wave propagating within an acousto-optic cell 23. The mechanical wave causes variations in the index of refraction of the acousto-optic cell which in turn cause a modulation of an light beam in accordance with the input signal, f(t). The modulated light beam exits the acousto-optic cell at an angle $\phi$ in the horizontal plane to the direction of the incident light, and the light in the modulated beam is shifted in frequency by the carrier frequency of signal f(t).

The photodetector 29 may be any of a number of devices known in the art. For example, it may be an array of charge-producing light-sensing elements, such as silicon photodiodes, connected to a corresponding array of capacitors or charge storage elements. Readout of the array can be via shift registers such as charge-coupled-device lines. Alternatively, the photodetector may be a vidicon to provide readout on a CRT.

The first dispersion means 25 is employed to disperse the modulated beam of light along the $\tau$ direction and bring it to focus along the longitudinal axis 24 of the cell 23. While the first dispersion means 25 may take a variety of forms, conveniently it may take the form shown in FIG. 3 of another linear acoustic cell 33 spaced in front of the cell 23 and disposed with its longitudinal axis 34 parallel to the $\tau$ direction; third dispersion means 35 disposed in front of the other cell 33; a pair of transducers 37 and 39 coupled to the other cell 33; and collimation means 41 disposed between the cells 33 and 23.

Figure 5:
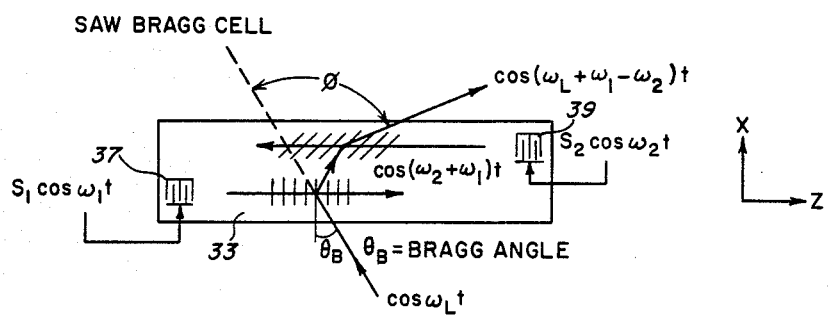
FIG. 5 shows the use of a Bragg cell of the surface-acoustic-wave design to encode a light beam with data.

The other linear acoustic cell 33 and the pair of transducers 37 and 39 may comprise, for example, a Bragg cell of the surface-acoustic wave (SAW) design, as shown in more detail in FIG. 5.

In the SAW design, modulation of the light beam by the acoustic wave occurs in an identical manner as in the bulkwave design. However, the SAW Bragg cell consists of an acousto-optic cell 33 and interdigital metal-finger electrode transducers 37 and 39. A feature of the SAW design is that two acousto-optic cells can be made on a single block of material, thereby allowing successive modulations of the light beam.

The preferred material for the SAW Bragg cell is Y-cut, Z-propagating lithium niobate (LiNbO$_3$). With this cut of LiNbO$_3$ it is possible to tilt the acoustic wavefront several degrees without affecting the wave propagation direction (group velocity vector). Thus it is possible to have a light ray undergo successive diffractions by counterpropagating SAW signals from the transducers and pick up a frequency shift equal to the difference in frequency between the SAW signals, as illustrated in FIG. 5. The required wavefront tilt is obtained by tilting one of the interdigital metal-finger electrode transducers from the normal to Z. There is no need to have separate paths for the two SAW signals if the acousto-optic interaction is in the linear range (the range over which there exists a linear relation between the fraction of light diffracted and the acoustic power), which is the usual range for operation. Use of SAW's allows arbitrary placement of the signals without suffering from reflections of the signals, even when paths are coincident.

The second dispersion means 31 disperses the diffracted light from the cell 23 along the $\omega$ direction (the vertical spatial dimension in FIG. 3) and brings it to a focus at the photodetector 29. While a variety of second dispersion means 31 may be employed, conveniently it may take the form shown in FIG. 3 of an optical computer 43 disposed behind the cell 23, a cylindrical lens 45 spaced one of its focal lengths behind the cell 23; a planar diffraction grating 47 ruled along the $\tau$ direction and spaced behind the cylindrical lens 45; and a spherical lens 49 spaced one of its focal lengths in front of the photodetector 29. Optical computers are discussed, for example, at page 598 of Jenkins and White, *Fundamentals of Optics*, 4th Edition.

The third dispersion means 35 is employed to disperse the modulated beam of light along the $\tau$ direction and bring it to focus along the longitudinal axis 34 of the other cell 33 so that the component waves are arranged in order of their wavelengths. While the third dispersion means 35 may take a variety of forms, conveniently it may take the form shown in FIG. 3 of a spherical lens 51 spaced by one of its focal lengths behind the source 33; a planar diffraction grating 53 ruled along the $\omega$ direction and spaced behind the spherical lens 51, and another spherical lens 55 spaced one of its focal lengths in front of the other cell 33.

The collimation means 41 collimates the diffracted component waves from the other cell 33 and focusses the collimated light along the longitudinal axes 24 of the cell 23. While a variety of collimation means may be employed, conveniently it may take the form shown in FIG. 3 of another optical computer 57 disposed behind the other cell 33; a curved diffraction grating 59 ruled along the $\omega$ direction and spaced behind the other optical computer 57; and a cylindrical lens 61 spaced one of its focal lengths in front of the cell 23. The diffraction grating 59 is curved to compensate for the chromatic dependence of the light diffraction angle $\phi$ (see FIG. 4), i.e., the dependence on light wavelength.

In operation, the modulator 21 intensity-modulates the beam of incoherent broadband light by a reference signal $S_1(t)$ whose frequency is much less than the frequencies of the spectral components present in the light (a condition which is valid for reference signals at radar frequencies), and the spherical lens 51 collimates the modulated light. The diffraction grating 53 disperses the collimated light along the $\tau$ direction and the other spherical lens 55 brings the dispersed light to focus along the longitudinal axis of the linear acoustic cell 33 so that the component waves which are of equal intensity are arranged in order of their light wavelengths, i.e. their colors. The pair of transducers 37 and 39 simultaneously input identical chirp signals $e^{i(\alpha t^2 + \omega_o t)}$ to the linear acoustic cell 33 as counterpropagating traveling waves. The chirp waveforms have a frequency f that varies linearly according to $f = (2\alpha t + \omega_o)/2\pi$ so that the angular frequency $\omega$ of the resultant of the superposed travelling waves is zero at the center of the cell, positive to one side and negative to the other side.

At any given location along the cell, $\omega$ is constant with time, even though the chirp frequency changes, since the counterpropagating signals have equal rates of frequency change. The parameters $\alpha$ and $\omega_o$ are chosen so that the values of $\omega$ correspond to the range of Doppler shifts to be represented in the ambiguity plane. Also, the chirp need not be complex, but can consist of a real sinusoid. The duration of the chirp must be approximately equal to the length of the signal or the integrating time of the ambiguity integral. As a numerical example, assume the signal duration or integration time is 30 msec., that the range of Doppler is $10^4$ Hz (corresponding to an object velocity of 100 m/sec at X-band radar frequencies), and that cell 33 has an aperture of 10 $\mu$sec. Then the chirp must have a duration of T=30 msec, an acceleration of $\alpha = 10^9$ Hz/sec, and a bandwidth of $\alpha T = 30$ MHz. Acceleration and bandwidth can be further decreased by increasing the aperture of the cell 33; apertures of a large as 40 $\mu$sec have been reported in Y-cut, Z-propagating LiNbO$_3$.

The counterpropagating travelling waves impart to each of the component light waves according to its location along the longitudinal axis of the cell a respective one of the plurality of different possible Doppler shifts so that each component wave of the dispersed light is modulated by a different possible Doppler-shifted variation of the reference signal $S_1(t)$. Since the chirp signal considered is assumed to have a linear FM or frequency change with time, and the grating dispersion is linear, the dependence of the frequency shift with position along the length of cell 33 is also linear.

The optical computer 57 blocks the passage of the undiffracted portion of the component waves from the linear acoustic cell 33 by focusing it with a Fourier transform lens (not shown) onto an opaque stop (not shown), while the diffraction grating 59 collimates the diffracted portion of the component waves. The cylindrical lens 61 brings the diffracted light to focus along the longitudinal axis of the second linear acoustic cell 23 so that the component waves are again arranged in order of their wavelengths. That is, each point along the longitudinal axis of the cell 23 can be considered to represent a secondary modulated source of light, each point corresponding to a different Doppler correction on the reference signal $S_1(t)$ according to the amount of frequency shift imparted by the cell 23, and each point identifiable by a unique color. The transducer 27 inputs the test signal $S_2^*(t)$ as a travelling wave to the linear acoustic cell 23 and the travelling wave scatters the focused light by Bragg diffraction. The second optical computer 43 blocks the passage of the undiffracted portion of the component waves from the linear acoustic cell 23 by focussing it with a Fourier transform lens (not shown) onto an opaque stop (not shown), while the cylindrical lens 45 collimates the diffracted portion of the component waves. The diffraction grating 47 disperses the collimated light along the $\omega$ direction and the spherical lens 49 brings the dispersed light to focus at the time-integrating photodetector 29. After integration for the duration T of the signals $S_1$ and $S_2^*$, there results an integrated charge pattern from the elements of the photodetector 29, corresponding to a multiplicity of correlations between the text and reference signals of the form $$\int_t S_1(t) S_2^*(t-\tau) e^{i\omega t} dt,$$

one for each row. That is, a graph of the ambiguity plane is produced on the photodetector. In this expression, $\tau$ is the delay variable arising from propagation of $S_2^*$ in the linear acoustic cell 23 as a travelling wave. Each row is distinguished by a particular color of light and therefore a different Doppler correction frequency. The row corresponding to the color that has been properly frequency-compensated (i.e. the color shifted by the same Doppler frequency as the frequency shift of the test signal relative to the reference signal) will contain a correlation function exhibiting a peak (at the value of $\tau$ equal to the time shift of the test signal relative to the reference signal). This peak will correspond to the maximum value of the ambiguity integral, and hence to a maximum in the integrated charge pattern. The actual number of parallel correlations is in practice determined by the resolution of the cell 23 and the number of rows available in the photodetector 29 array.

It is obvious that many modifications and variations of the present invention are possible in light of the above teachings. For example, an improved version of the previously discussed preferred embodiment can be obtained through the use of integrated optics, whereby all light rays are confined within a planar waveguide.

An integrated-optic implementation is possible, since the acousto-optic cells are not constrained to be orthogonal to each other as is the case for time-integrating processors of the prior art, such as that disclosed in the above-cited Turpin patent, but can be parallel to each other as shown in FIG. 3 for the preferred embodiment. Integrated-optical counterparts exist for lenses and gratings. The cylindrical lens 61 in FIG. 3 can be eliminated, since the light is already confined within a plane. SAW Bragg cells must be used for both acousto-optic cells. The light source 33 may be either butt-coupled or end-fire coupled into the optical waveguide. Cylindrical lens 45, diffraction grating 47, spherical lens 49, and photodetector array 29 must lie outside the integrated-optic structure, since a two-dimensional display must be obtained for the ambiguity integral. The integrated-optic portion of this embodiment provides added compactness and ruggedness.

It is therefore to be understood that within the scope of the appended claims, the invention may be practiced otherwise than as described.

What is claimed as new and desired to be secured by Letters Patent of the United States is:

1. Apparatus for spatially evaluating the ambiguity integral using a beam of incoherent broadband light with component waves comprising:
   modulation means for modulating the broadband beam of incoherent light by a reference signal;
   a first linear acoustic cell disposed with its longitudinal axis parallel to a first spatial dimension;
   first dispersion means for dispersing along the first spatial dimension and bringing to a focus along the longitudinal axis of the first cell the modulated beam of incoherent broadband light in which the component waves are each modulated by a different Doppler-shifted variation of the reference signal;
   a first transducer coupled for inputting to the first cell a test signal as a travelling wave to scatter by Bragg diffraction the light focussed along the longitudinal axis of the first cell;
   a time-integrating photodetector; and
   second dispersion means for dispersing along a second mutually orthogonal spatial dimension and bringing to focus at the time-integrating photodetector the diffracted light to produce a graph of the ambiguity plane wherein the colors identify the different Doppler components.

2. The apparatus recited in claim 1 wherein the first dispersion means includes:
   a second linear acoustic cell spaced in front of the first cell and disposed with its longitudinal axis parallel to the first spatial dimension.

3. The apparatus recited in claim 2 wherein the first dispersion means includes:
   third dispersion means for dispersing along the first spatial dimension and bringing to focus along the longitudinal axis of the second cell the modulated beam of incoherent broadband light so that the component waves are arranged in order of their wavelengths.

4. The apparatus recited in claim 3 wherein the first dispersion means includes:
   a pair of second transducers coupled for inputting to the second cell identical chirp signals as counter-propagating travelling waves to scatter by Bragg diffraction and impart to each of the component light waves a respective one of a plurality of different possible Doppler shifts.

5. The apparatus recited in claim 4 wherein the first dispersion means includes:
   collimation means for collimating the diffracted component waves and focusing the collimated light along the longitudinal axis of the first cell.

6. The apparatus recited in claim 5 wherein the second dispersion means includes:
   an optical computer disposed behind the first cell for blocking passage of the undiffracted portion of the component waves to the photodetector.

7. The apparatus recited in claim 6 wherein the second dispersion means includes:
   a cylindrical lens spaced one of its focal lengths behind the first cell for collimating the diffracted light from the first cell.

8. The apparatus recited in claim 7 wherein the second dispersion means includes:
   a diffraction grating ruled along the first spatial dimension and spaced behind the cylindrical lens for dispersing the collimated light along the second mutually orthogonal dimension.

9. Apparatus for optically evaluating the ambiguity integral using a broadband beam of incoherent light with component waves comprising:
   modulation means for modulating the beam of incoherent broadband light by a reference signal;
   a first linear acoustic cell disposed with its longitudinal axis parallel to a first spatial dimension;
   a second linear acoustic cell spaced in front of the first cell and disposed with its longitudinal axis parallel to the first spatial dimension;
   third dispersion means for dispersing along the first spatial dimension and bringing to a focus along the longitudinal axis of the second cell the modulated beam of incoherent broadband light so that the component waves are arranged in order of their wavelengths;
   a pair of second transducers coupled for inputting to the second cell identical chirp signals as counter-propagating travelling waves to scatter by Bragg diffraction and impart to each of the component light waves a respective one of a plurality of different possible Doppler shifts so that the component waves are each modulated by a different Doppler-shifted variation of the reference signal;
   collimation means for collimating the diffracted component waves and focusing the collimated light along the longitudinal axis of the first cell;
   a first transducer coupled for inputting to the first cell a test signal as a travelling wave to scatter by Bragg diffraction the light focussed along the longitudinal axis of the first cell;
   a time-integrating photodetector;
   a first optical computer disposed behind the first cell for blocking passage of the undiffracted portion of the component waves to the photodetector;
   a first cylindrical lens spaced one of its focal lengths behind the first cell for collimating the diffracted light from the first cell;
   a first diffraction grating ruled along the first spatial dimension and spaced behind the first cylindrial lens for dispersing the collimated light along a second mutually orthogonal dimension; and
   a first spherical lens spaced one of its focal lengths in front of the photodetector for bringing the dispersed light to a focus at the photodetector to produce a graph of the ambiguity plane wherein the colors identify the different Doppler components.

10. The apparatus recited in claim 9 wherein the third dispersion means includes:
   a second spherical lens for collimating the modulated beam of incoherent broadband light.

11. The apparatus recited in claim 10 wherein the third dispersion means includes:
   a second diffraction grating ruled along the second mutually orthogonal spatial dimension and spaced behind the second spherical lens for dispersing the collimated light therefrom along the first spatial dimension.

12. The apparatus recited in claim 11 wherein the third dispersion means includes:
   a third spherical lens spaced one of its focal lengths in front of the second cell for bringing the dispersed light to a focus along the longitudinal axis of the second cell.

13. The apparatus recited in claim 12 wherein the collimation means includes:
   a second optical computer disposed behind the second cell for blocking passage of the undiffracted portion of the component waves from the second cell.

14. The apparatus recited in claim 13 wherein the collimation means includes:
   a third diffraction grating ruled along the second mutually orthogonal direction and spaced behind the second optical computer for collimating the diffracted portion of the component waves.

15. Apparatus for optically evaluating the ambiguity integral using a broadband beam of incoherent light with component waves comprising:
   modulation means for modulating the beam of incoherent broadband light by a reference signal;
   a first linear acoustic cell disposed with its longitudinal axis parallel to a first spatial dimension;
   a second linear acoustic cell spaced in front of the first cell and disposed with its longitudinal axis parallel to the first spatial dimension;
   a first spherical lens for collimating the modulated beam of incoherent broadband light;
   a first diffraction grating ruled along a second mutually orthogonal spatial dimension and spaced behind the first spherical lens for dispersing the collimated light therefrom along the first spatial dimension;
   a second spherical lens spaced one of its focal lengths in front of the second cell for bringing the dispersed light to a focus along the longitudinal axis of the second cell so that the component waves are arranged in order of their wavelengths;
   a pair of second transducers coupled for inputting to the second cell identical chirp signals as counterpropagating travelling waves to scatter by Bragg diffraction and impart to each of the component light waves a respective one of a plurality of different possible Doppler shifts so that the component waves are each modulated by a different Doppler-shifted variation of the reference signal;
   a first optical computer disposed behind the second cell for blocking passage of the undiffracted portion of the component waves from the second cell;
   a second diffraction grating ruled along the second mutually orthogonal direction and spaced behind the first optical computer for collimating the diffracted portion of the component waves;
   a first cylindrical lens spaced one of its focal lengths in front of the first cell for bringing the diffracted light to focus along the longitudinal axis of the first cell;
   a first transducer coupled for inputting to the first cell a test signal as a travelling wave to scatter by Bragg diffraction the light focussed along the longitudinal axis of the first cell;
   a time-integrating photodetector;
   a second optical computer disposed behind the first cell for blocking passage of the undiffracted portion of the component waves to the photodetector;
   a second cylindrical lens spaced one of its focal lengths behind the first cell for collimating the diffracted light from the first cell;
   a third diffraction grating ruled along the first spatial dimension and spaced behind the second cylindrical lens for dispersing the collimated light along a second mutually orthogonal dimension; and
   a third spherical lens spaced one of its focal lengths in front of the photodetector for bringing the dispersed light to a focus at the photodetector to produce a graph of the ambiguity plane wherein the colors identify the different Doppler components.

16. A method of optically evaluating the ambiguity integral using a beam of incoherent broadband light with component waves comprising the steps of:
   (a) modulating the beam of incoherent broadband light by a reference signal;
   (b) dispersing the modulated beam of light along a first spatial dimension and bringing it to focus along the longitudinal axis of a first linear acoustic cell so that the component waves are each modulated by a different Doppler-distorted variation of the reference signal;
   (c) inputting to the first cell a test signal as a travelling wave to scatter by Bragg diffraction the light focussed along the longitudinal axis of the first cell; and
   (d) dispersing the diffracted light along a second mutually orthogonal spatial dimension and bringing it to focus at a time-integrating photodetector to produce a graph of the ambiguity plane wherein the colors identify the different Doppler components.

17. The method recited in claim 16 wherein step (b) includes:
   dispersing the modulated beam of light along the first spatial dimension and bringing it to focus along the longitudinal axis of a second linear acoustic cell spaced in front of the first cell so that the component waves are arranged in order of their wavelengths.

18. The method recited in claim 17 wherein step (b) includes:
   inputting to the second cell identical chirp signals as counterpropagating travelling waves to scatter by Bragg diffraction and impart to each of the component light waves a respective one of a plurality of different possible Doppler shifts.

19. The method recited in claim 18 wherein step (b) includes:
   collimating the diffracted component waves and focusing the collimated light along the longitudinal axis of the first cell.

20. The method recited in claim 19 wherein step (d) includes:
   blocking passage of the undiffracted portion of the component waves from the first cell to the photodetector.

* * * * *